United States Patent
Nagasaka

(10) Patent No.: US 9,858,510 B2
(45) Date of Patent: Jan. 2, 2018

(54) INFORMATION PROCESSING APPARATUS, METHOD FOR CONTROLLING THE SAME, AND STORAGE MEDIUM FOR CONVERSION PROCESSING USING PLURAL GEOMETRIC TRANSFORMATIONS ON IMAGE DATA

(71) Applicant: CANON KABUSHIKI KAISHA, Tokyo (JP)

(72) Inventor: Hitoshi Nagasaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/719,556

(22) Filed: May 22, 2015

(65) Prior Publication Data
US 2015/0339547 A1    Nov. 26, 2015

(30) Foreign Application Priority Data
May 26, 2014 (JP) ................................. 2014-108421

(51) Int. Cl.
*H04N 1/38* (2006.01)
*H04N 1/407* (2006.01)
(Continued)

(52) U.S. Cl.
CPC ......... *G06K 15/181* (2013.01); *G06F 3/1212* (2013.01); *G06F 3/1244* (2013.01); *G06F 3/1288* (2013.01)

(58) Field of Classification Search
CPC ........... G06K 15/1835; G06K 15/1842; G06K 15/1843; G06K 15/1836; G06K 15/1861;
(Continued)

(56) References Cited

U.S. PATENT DOCUMENTS 7,099,042 B2 * 8/2006 Yaguchi ............... H04N 1/6027
358/1.9
7,619,790 B2 * 11/2009 Kambegawa ........ H04N 1/4072
358/1.1
(Continued)

FOREIGN PATENT DOCUMENTS

JP            7-182502 A        7/1995

*Primary Examiner* — Hai Phan
*Assistant Examiner* — Jonathan R Beckley
(74) *Attorney, Agent, or Firm* — Canon USA Inc., IP Division

(57) ABSTRACT

An information processing apparatus includes an acquisition unit configured to acquire image data with which transformation information including at least transformation components of a first type and a second type, the second type being different from the first type, is associated, a specifying unit configured to specify the transformation component of the first type from the transformation information, a transformation unit configured to perform, based on the transformation information, transformation processing based on the transformation component of the second type included in the transformation information for the image data, a generation unit configured to generate a command for performing transformation processing based on the specified transformation component of the first type for the converted image data, and a transmission unit configured to transmit the generated command to a printing apparatus. The transformation components of the first and second types are geometric transformation components. The command conforms to the printing apparatus.

13 Claims, 12 Drawing Sheets

(51) Int. Cl.
*H04N 1/409* (2006.01)
*G06K 15/02* (2006.01)
*G06F 3/12* (2006.01)

(58) Field of Classification Search
CPC ........... G06K 15/1856; G06K 15/1855; G06K 15/1848; G06K 15/1223; G06K 15/1822; G06K 15/1825; G06K 15/1803; G06K 15/1859; H04N 1/387; H04N 1/3872; H04N 1/3873; H04N 1/3877; H04N 1/3878; H04N 1/393; H04N 1/3935; H04N 1/32149; H04N 1/32144; H04N 1/32154; H04N 1/32187; H04N 1/32192; H04N 1/32197; H04N 1/32315; H04N 1/32336; G06F 3/1247; G06F 3/1248; G06F 3/1206; G06F 3/1208; G06F 3/1209; G06F 3/1211
See application file for complete search history.

(56) References Cited

U.S. PATENT DOCUMENTS

| | | | | |
|---|---|---|---|---|
| 8,953,214 | B2* | 2/2015 | Kobayashi | G06F 3/1211 358/1.13 |
| 9,626,602 | B2* | 4/2017 | Conlon | G06K 15/02 |
| 2004/0218218 | A1* | 11/2004 | De Bie | G06K 15/02 358/1.18 |
| 2012/0133985 | A1* | 5/2012 | Kida | G06K 15/1814 358/1.16 |
| 2015/0043015 | A1* | 2/2015 | Warren | G06K 15/1856 358/1.2 |

* cited by examiner

FIG.1A $$\begin{pmatrix} Sx & 0 \\ 0 & Sy \end{pmatrix} \overset{201}{} \Rightarrow \overset{202}{[Sx\ 0\ 0\ Sy]}$$

FIG.1B $$\begin{pmatrix} \cos\theta & -\sin\theta \\ \sin\theta & \cos\theta \end{pmatrix} \overset{203}{} \Rightarrow \overset{204}{[\cos\theta\ \sin\theta\ -\sin\theta\ \cos\theta]}$$

FIG.1C $$\begin{pmatrix} 1 & \tan\beta \\ \tan\alpha & 1 \end{pmatrix} \overset{205}{} \Rightarrow \overset{206}{[1\ \tan\alpha\ \tan\beta\ 1]}$$

FIG.4

```
20 0 obj                                    %PAGE OBJECT
        <<  /Type    /Page
            /Parent  1 0 R
            /Resources 21 0 R
            /MediaBox [0 0 612 792]
            /Contents 23 0 R
        >>
endobj 21 0 obj                                    %RESOURCE DICTIONARY OF PAGE OBJECT
        <<  /ProcSet[/PDF  ImageB]
            /XObject <</Im1 22 0 R>>
        >>
endobj 22 0 obj                                    %XObject OF IMAGE
        <<  /Type     /XObject
            /Subtype  /Image
            /Width    256
            /Height   256
            /ColorSpace /DeviceGray
            /TitsPerComponent 8
            /Length   83183
            /Filter   /ASCII85Decode
        >>                              504
stream
[;43[@@34[;@./b.evg;as;rawergf[@adr[@gea[@rgfae···   %IMAGE DATA
endstream
endobj                                                                  501

23 0 obj                                    %CONTENT OF PAGE
        <<  /Length 56>>
stream                          502
        q
            0.8660 0.5000 -0.5000 0.8600 0 0 cm    %STORE GRAPHICS STATE
            6.0 0 0 2.0 0 0 cm                     %ROTATE BY 30°
                                                   %6.0 TIMES IN x-AXIS DIRECTION AND 2.0 TIMES IN y-AXIS DIRECTION
            /Image1 Do                             %PAINT IMAGE
        Q                                          %RESTORE GRAPHICS STATE
endstream           503
endobj
```

FIG.10

$$\begin{pmatrix} 0.8660 & -0.5000 \\ 0.5000 & 0.8660 \end{pmatrix} \begin{pmatrix} 6.0 & 0 \\ 0 & 2.0 \end{pmatrix} \overbrace{\phantom{xxxxxxx}}^{1101}$$

$$= \begin{pmatrix} 0.8660 & -0.5000 \\ 0.5000 & 0.8660 \end{pmatrix} \begin{pmatrix} 3.0 & 0 \\ 0 & 1.0 \end{pmatrix} \begin{pmatrix} 2.0 & 0 \\ 0 & 2.0 \end{pmatrix} \overbrace{\phantom{xxxx}}^{1102}$$

$$= \begin{pmatrix} 2.0 & 0 \\ 0 & 2.0 \end{pmatrix} \begin{pmatrix} 0.8660 & -0.5000 \\ 0.5000 & 0.8660 \end{pmatrix} \begin{pmatrix} 3.0 & 0 \\ 0 & 1.0 \end{pmatrix} \overbrace{\phantom{xxxx}}^{1103}$$

```
...
ImageWriteStart
ImageBinary=ff ff ff ff ff|00 00 00 ...    %BINARY DATA OF BITMAP
ImageWriteEnd                  1201
...
```

FIG.11B

```
...
ImageWriteStart
ImageBinary=ff 00 00 ff ff 00 ff|ff ff ...    %BINARY DATA OF BITMAP
                                  1202
ImageScalingX=6.0    %ENLARGED COMPONENT OF BITMAP IN X DIRECTION
ImageScalingY=2.0    %ENLARGED COMPONENT OF BITMAP IN Y DIRECTION
ImageWriteEnd        1203
...
```

US 9,858,510 B2

INFORMATION PROCESSING APPARATUS, METHOD FOR CONTROLLING THE SAME, AND STORAGE MEDIUM FOR CONVERSION PROCESSING USING PLURAL GEOMETRIC TRANSFORMATIONS ON IMAGE DATA

BACKGROUND OF THE INVENTION

Field of the Invention

The present invention relates to a conversion processing technology for image data.

Description of the Related Art

A printing apparatus receives a drawing command (page description language (PDL) command) described in PDL from a personal computer (PC) or a web server (hereinafter, host), and performs print processing according to the command. A document for printing may include a bitmap drawing. The bitmap drawing generally has a size as the PDL drawing command larger than those of other drawings such as graphics or texts, and transfer time to the printing apparatus is accordingly longer. This leads to an increase of total printing time. Further, in print services using a cloud environment, which is a recent focus of attention, the transfer time is a bottleneck in total printing time in many cases.

Japanese Patent Application Laid-Open No. 7-182502 discusses a technology for reducing a size of a PDL command by performing a thinning operation for a bitmap. To suppress deterioration of a drawing, an influence on a user engaged in printing can be suppressed by interactively instructing a thinning position.

However, the thinning operation may cause a loss of information in the bitmap, thus generating an output unintended by the user. For the bitmap, in many cases, geometric transformation (affine transformation) such as enlargement or rotation is designated. For example, when only enlargement is designated, enlargement processing is generally carried out for the bitmap in the printing apparatus. On the other hand, for example, when printing is performed in a printing apparatus that cannot carry out rotation processing for the bitmap, if enlargement and rotation are designated for the bitmap, the host side is not allowed to carry out only the rotation processing in principle. It is because since exchanging is impossible between enlargement and rotation and a processing order is complex, the host side cannot simply carry out only the enlargement processing.

The influence of the processing order will be described referring to FIGS. 12A and 12B. FIG. 12A illustrates an example when rotation processing is performed after enlargement processing has performed for a bitmap. FIG. 12B illustrates an example when enlargement processing is performed after rotation processing has performed. Results are not similar. Thus, when enlargement and other transformation processes for the bitmap are included, the host side must carry out all the conversion processes. This increases a size of a bitmap drawing command. As a result, a size of a PDL command increases.

SUMMARY OF THE INVENTION

According to the present invention, conversion processing for a bitmap is divided between an information processing apparatus and a printing apparatus to be performed.

According to an aspect of the present invention, an information processing apparatus includes an acquisition unit configured to acquire image data with which transformation information including at least a transformation component of a first type and a transformation component of a second type different from the first type is associated, a specifying unit configured to specify the transformation component of the first type from the transformation information, a transformation unit configured to perform, based on the transformation information, transformation processing based on the transformation component of the second type included in the transformation information for the image data, a generation unit configured to generate a command for performing transformation processing based on the specified transformation component of the first type for the converted image data, and a transmission unit configured to transmit the generated command to a printing apparatus. The transformation components of the first and second types are geometric transformation components. The command conforms to the printing apparatus.

Further features of the present invention will become apparent from the following description of exemplary embodiments with reference to the attached drawings.

BRIEF DESCRIPTION OF THE DRAWINGS

FIGS. 1A, 1B and 1C are diagrams illustrating conversion matrixes in conversion processing for a bitmap.

FIG. 4 is a diagram illustrating an example of conversion information for a bitmap of a document.

FIG. 10 is a diagram illustrating a specific example when the enlarged component is decomposed.

FIGS. 11A and 11B are diagrams illustrating conversion information according to the present exemplary embodiment.

DESCRIPTION OF THE EMBODIMENTS

Figure 2:
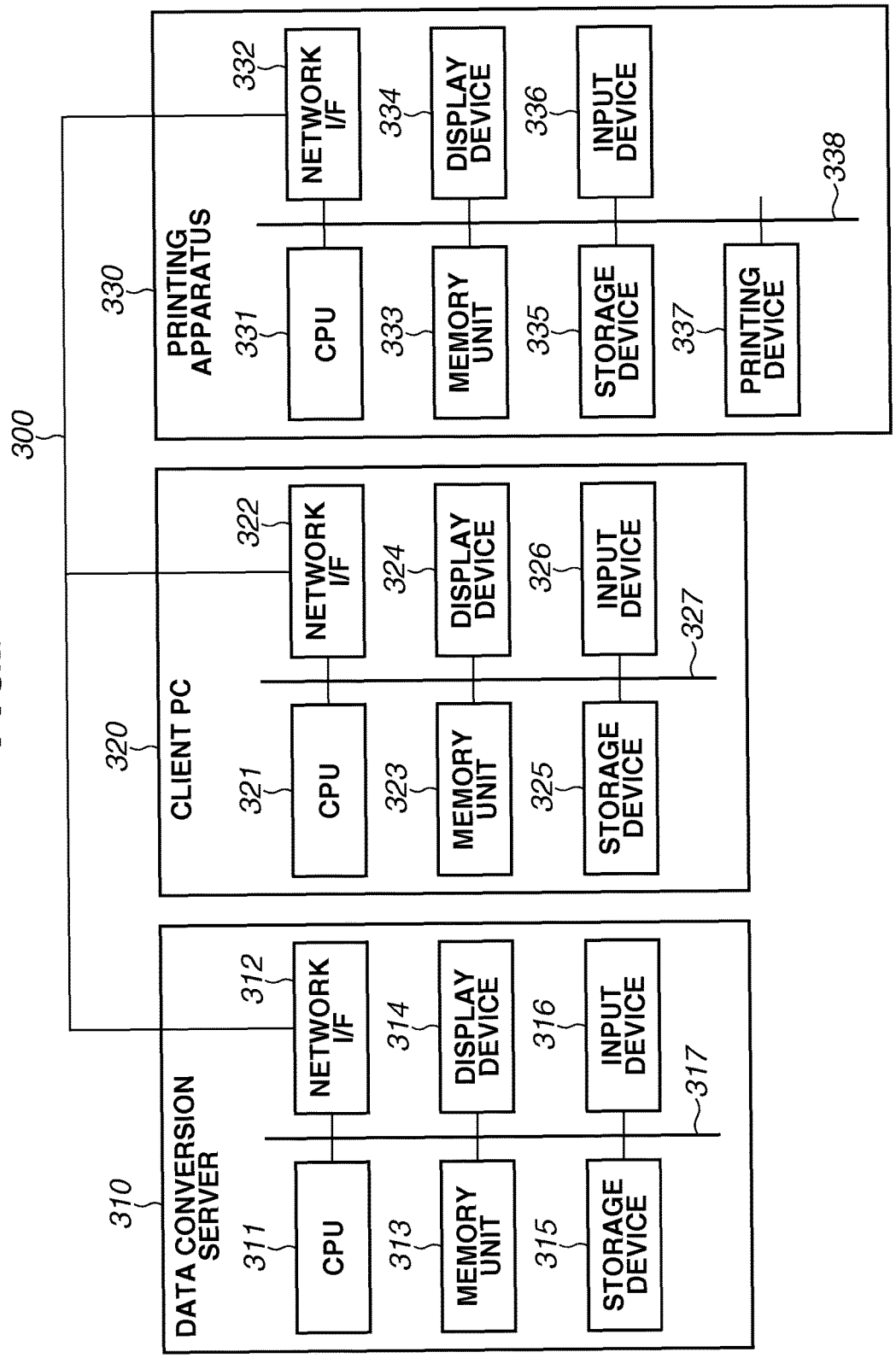
FIG. 2 is a diagram illustrating an overall configuration of an information processing system.

Hereinafter, the exemplary embodiments of the present invention will be described with reference to the drawings.

First, referring to FIGS. 1A to 1C, conversion processing into a bitmap (image data) according to the present exemplary embodiment will be described. The "conversion processing" may include "transformation processing" hereinafter. FIGS. 1A to 1C illustrate matrixes used in conversion processing according to the present exemplary embodiment. In the conversion processing, FIG. 1A in which linear conversion is carried out by using a matrix illustrates enlargement/reduction (scaling). A matrix 201 represents a conversion matrix where enlargement by Sx and Sy times respectively in X and Y directions is performed. In the present exemplary embodiment, the matrix 201 is set to a matrix 202 [Sx 0 0 Sy]. The X direction is a first direction of the bitmap image, and the Y direction is a second direction orthogonal to the first direction. The Sx and the Sy respectively indicate X and Y components in the enlarged matrix. FIG. 1B illustrates rotation. A matrix 203 represents a conversion matrix where rotation by θ anticlockwise is performed. In the present exemplary embodiment, the matrix 203 is set to a matrix 204 [cos θ sin θ -sin θ cos θ]. FIG. 1C illustrates skew. A matrix 205 represents a conversion matrix where inclination by α and β respectively in the X and Y directions is performed. In the present exemplary embodiment, the matrix 205 is set to a matrix 206 [1 tan α tan β 1]. In addition, other matrixes in the present exemplary embodiment are described by using similar rules (formats).

FIG. 2 is a block diagram illustrating an overall configuration of an information processing system according to the present exemplary embodiment. The information processing system according to the present exemplary embodiment is a system for generating a PDL command from a document that a user wishes to print. The information processing system includes a data conversion sever 310, a client PC 320, a printing apparatus 330, and a network 300 for interconnecting these units.

The network 300 may be, for example, a local area network (LAN) or a wide area network (WAN). The data conversion server 310 includes a central processing unit (CPU) 311, a network interface (I/F) 312, a memory unit 313, a display device 314, a storage device 315, and an input device 316.

The CPU 311 is in overall control of the data conversion server 310. The network I/F 312 connects the data conversion server 310 to the other apparatus such as the client PC 320 or the printing apparatus 330 via the network 300. The memory unit 313 is, for example, a random access memory (RAM) or a read-only memory (ROM). The display device 314 is a display that carries out displaying. The storage device 315 may be a general storage device including a hard disk drive or a flash memory, and is used for storing an operating system (OS), a program, and data. The input device 316 is an input device such as a keyboard or a mouse. The components of the data conversion server 310 communicate with one another via an interconnection bus 317.

Software for achieving operation processing of the data conversion server 310 according to the present exemplary embodiment is stored, for example, in a medium readable by a computer including the storage device 315. The software is loaded from the computer-readable medium to the computer, and executed by the CPU 311 of the data conversion server 310. Then, the data conversion server 310 can be operated as an apparatus advantageous for generating a size-reduced PDL command.

The client PC 320 includes a CPU 321, a network I/F 322, a memory unit 323, a display device 324, a storage device 325, and an input device 326. The CPU 321 is in overall control of the client PC 320. The network I/F 322 connects the client PC 320 to the other apparatus such as the data conversion server 310 or the printing apparatus 330 via the network 300. The memory unit 323 is, as in the case of the memory unit 313, for example, a RAM or a ROM. The display device 324 is, as in the case of the display device 314, a display that carries out displaying. The storage device 325 may be, as in the case of the storage device 315, a general storage device including a hard disk drive or a flash memory, and is used for storing an OS, a program, and data. The input device 326 is, as in the case of the input device 316, an input device such as a keyboard or a mouse. The components of the client PC 320 communicate with one another via an interconnection bus 327.

Software for achieving operation processing of the client PC 320 according to the present exemplary embodiment is stored, as in the case of the data conversion server 310, in a medium readable by a computer including the storage device 325. The software is loaded from the computer-readable medium to the computer, and executed by the CPU 321 of the client PC 320. Then, the client PC 320 can be operated as an apparatus advantageous for generating a size-reduced PDL command.

The printing apparatus 330 includes a CPU 331, a network I/F 332, a memory unit 333, a display device 334, a storage device 335, an input device 336, and a printing device 337. The CPU 331 is in overall control of the printing apparatus 330. The network I/F 332 connects the printing apparatus 330 to the other apparatus such as the data conversion server 310 or the client PC 320 via the network 300. The memory unit 333 is, as in the case of the memory unit 313, for example, a RAM or a ROM. The display device 334 is, as in the case of the display device 314, a display that carries out displaying. The storage device 335 may be, as in the case of the storage device 315, a general storage device including a hard disk drive or a flash memory, and is used for storing an OS, a program, and data. The input device 336 is, as in the case of the input device 316, an input device such as a keyboard or a mouse. The printing device 337 is a device for printing toner or ink on a medium such as paper. The components of the printing apparatus 330 communicate with one another via an interconnection bus 338.

Software for achieving operation processing of the printing apparatus 330 according to the present exemplary embodiment is stored, as in the case of the data conversion server 310, in a medium readable by a computer including the storage device 335. The software is loaded from the computer-readable medium to the computer, and executed by the CPU 331 of the printing apparatus 330. Then, the printing apparatus 330 can be operated as an apparatus advantageous for generating a size-reduced PDL command.

PDL conversion processing carried out in the information processing system according to the present exemplary embodiment will be described. A basic process in the PDL conversion processing will be described referring to FIG. 2. First, the client PC 320 transmits, by using document printing software, a document stored in the client PC 320 and desired to be printed to the data conversion server 310, and issues a printing request. Next, in the data conversion server 310, document conversion software acquires, in response to the printing request from the document printing software, a document to generate a PDL command, and transmits the generated PDL command and the printing request to the printing apparatus 330. Then, the printing apparatus 330 acquires, in response to the printing request from the document conversion software, the generated PDL command to execute printing on a medium such as paper. The document printing software is software for acquiring a document stored in the client PC 320 to generate a PDL command in the data conversion server 310, and for issuing a printing request for printing the PDL command with the printing apparatus 330. The document printing software is stored in the storage device 325 of the client PC 320, and loaded to the memory unit 323 to be executed by the CPU 321. The document conversion software is software for generating, in response to the printing request from the client PC 320, a PDL command, and for issuing a printing request to the printing apparatus 330. The document conversion software is stored in the storage device 315 of the data conversion server 310, and loaded to the memory unit 313 to be executed by the CPU 311. In the present exemplary embodiment, the document printing software and the document conversion software are used. Not limited to such software, however, the apparatuses only need to have similar functions.

Figure 3:
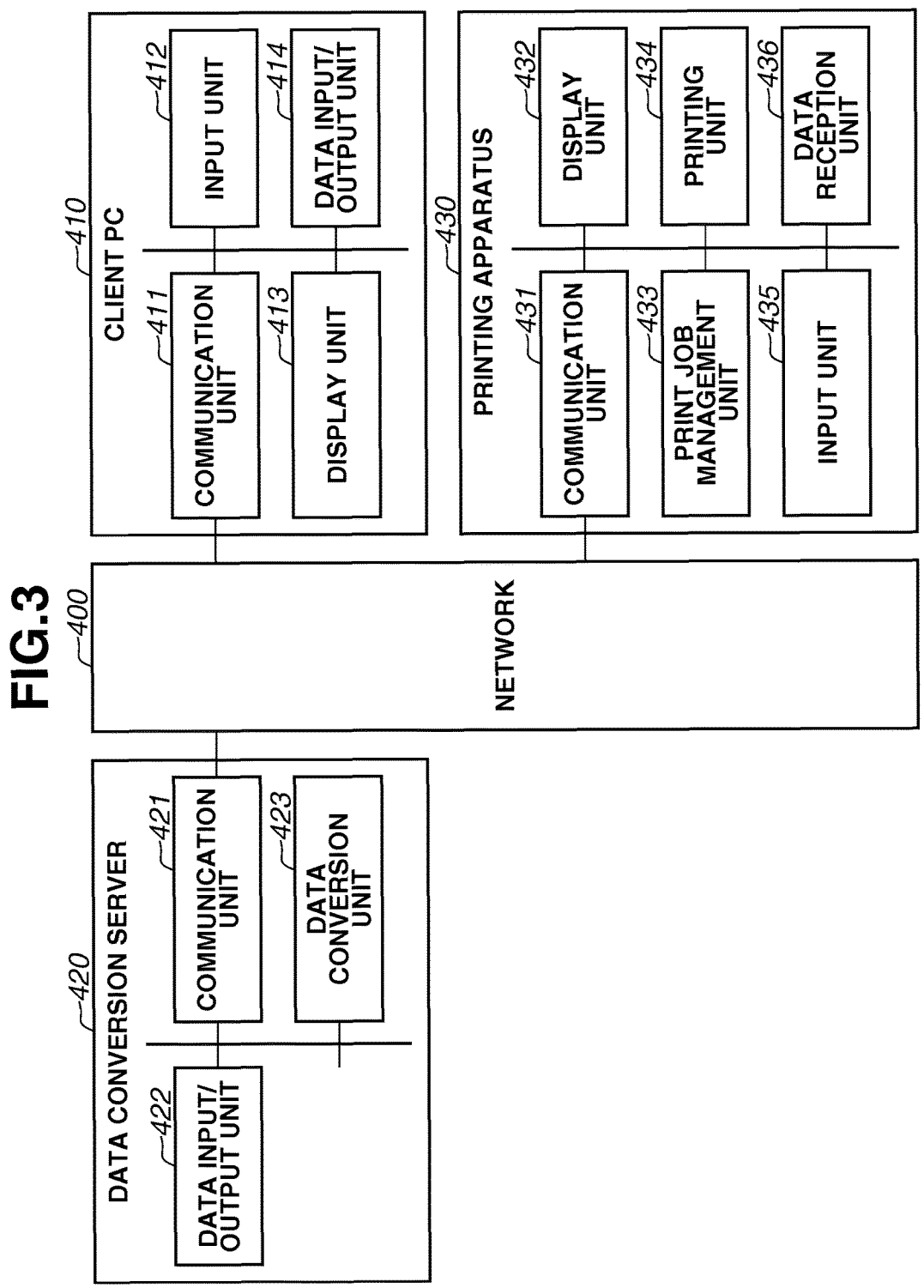
FIG. 3 is a diagram illustrating an overall configuration of a data conversion system.

Referring to FIG. 3, the PDL conversion processing according to the present exemplary embodiment will be described. FIG. 3 is a diagram illustrating an overall configuration of a data conversion system that carries out, based on a data printing request of a client PC 410, PDL conversion processing by using a document transmitted from the client PC 410 and print setting, and outputs data to a printing apparatus 430 to execute printing. In the data conversion system according to the present exemplary embodiment, the client PC 410 for issuing a document printing request, a data conversion server 420 for converting a document into a PDL command, and the printing apparatus 430 are interconnected via a network 400. The client PC 410, the data conversion server 420, and the printing apparatus 430 illustrated in FIG. 3 respectively include components similar to those of the client PC 320, the data conversion server 310, and the printing apparatus 330 illustrated in FIG. 2. In FIG. 3, description of the components included in the client PC 320, the data conversion server 310, and the printing apparatus 330 is omitted.

The client PC 410 may be, for example, an information processing apparatus including a mobile terminal such as a smartphone or a tablet terminal. Not to limited to such a mobile terminal, however, the client PC 410 may be another information processing apparatus. The client PC 410 includes a communication unit 411, an input unit 412, a display unit 413, and a data input/output unit 414. The communication unit 411 is connected to the network 400 such as the Internet or an intranet to execute network-communication with other devices. The user inputs data or an instruction by using the input unit 412. The display unit 413 displays a user's operation content or the like. The data input/output unit 414 inputs or outputs a document or print data. The data input/output unit 414 includes document printing software for issuing a printing request to the data conversion server 420.

The data conversion server 420 includes a communication unit 421, a data input/output unit 422, and a data conversion unit 423. The communication unit 421 is connected to the network 400 such as the Internet or the intranet to execute network-communication with other devices. The data input/output unit 422 inputs or outputs a document or print data from or to the outside. The data conversion unit 423 executes conversion processing for converting the document into a PDL command. The data conversion unit 423 includes document conversion software for generating, in response to the printing request from the client PC 410, a PDL command to transmit the printing request to the printing apparatus 430.

The printing apparatus 430 includes a communication unit 431, a display unit 432, a print job management unit 433, a printing unit 434, an input unit 435, and a data reception unit 436. The communication unit 431 is connected to the network 400 such as the Internet or the intranet to execute network-communication with other devices. The display unit 432 displays various data in the printing apparatus 430. The print job management unit 433 manages a print job, and the printing unit 434 carries out print processing of print data. The user inputs data or an instruction by using the input unit 435. The data reception unit 436 receives data for printing such as a PDL command. The printing apparatus 430 performs print processing in response to the printing request from the data conversion server 420 or the client PC 410.

In the information processing system illustrated in FIG. 3, as in the case described above referring to FIG. 2, first, the client PC 410 transmits a document stored in the client PC 410 to the data conversion server 420, and issues a printing request. Next, the data conversion server 420 generates, in response to the printing request from the client PC 410, a PDL command from the document, and transmits the generated PDL command and the printing request to the printing apparatus 430. Then, the printing apparatus 430 acquires, in response to the printing request from the document conversion server 420, the PDL command to execute printing on a medium such as paper.

FIG. 4 is a diagram illustrating an example of conversion information for a bitmap of a document. In the present exemplary embodiment, specifically, data included in a Portable Document Format (PDF) provided from Adobe Systems Incorporated is described as an example. In the present exemplary embodiment, a conversion instruction is described for a bitmap of a document. Here, conversion information is information regarding geometric transformation processing (affine transformation processing) carried out for the bitmap including enlargement processing, rotation processing, or skew processing. In FIG. 4, a statement written in the right of a symbol % is a comment. A drawing 501 represents a bitmap drawing method, and designated between a q operator and a Q operator in the present exemplary embodiment. In a matrix 502, conversion processing for the bitmap is written, and a conversion matrix is designated by using a cm operator. In the present exemplary embodiment, as indicated by comments written in the drawing 501, an instruction for rotation by 30° anticlockwise, and an instruction for enlargement processing by 6.0 times and 2.0 times respectively in X and Y directions are written. In the matrix 502, 5-th and 6-th (numerical values: 0) elements indicate parallel movements. A paint instruction 503 is a paint instruction for drawing a bitmap (drawing 504 in the present exemplary embodiment) written separately from the drawing 501.

Figure 5:
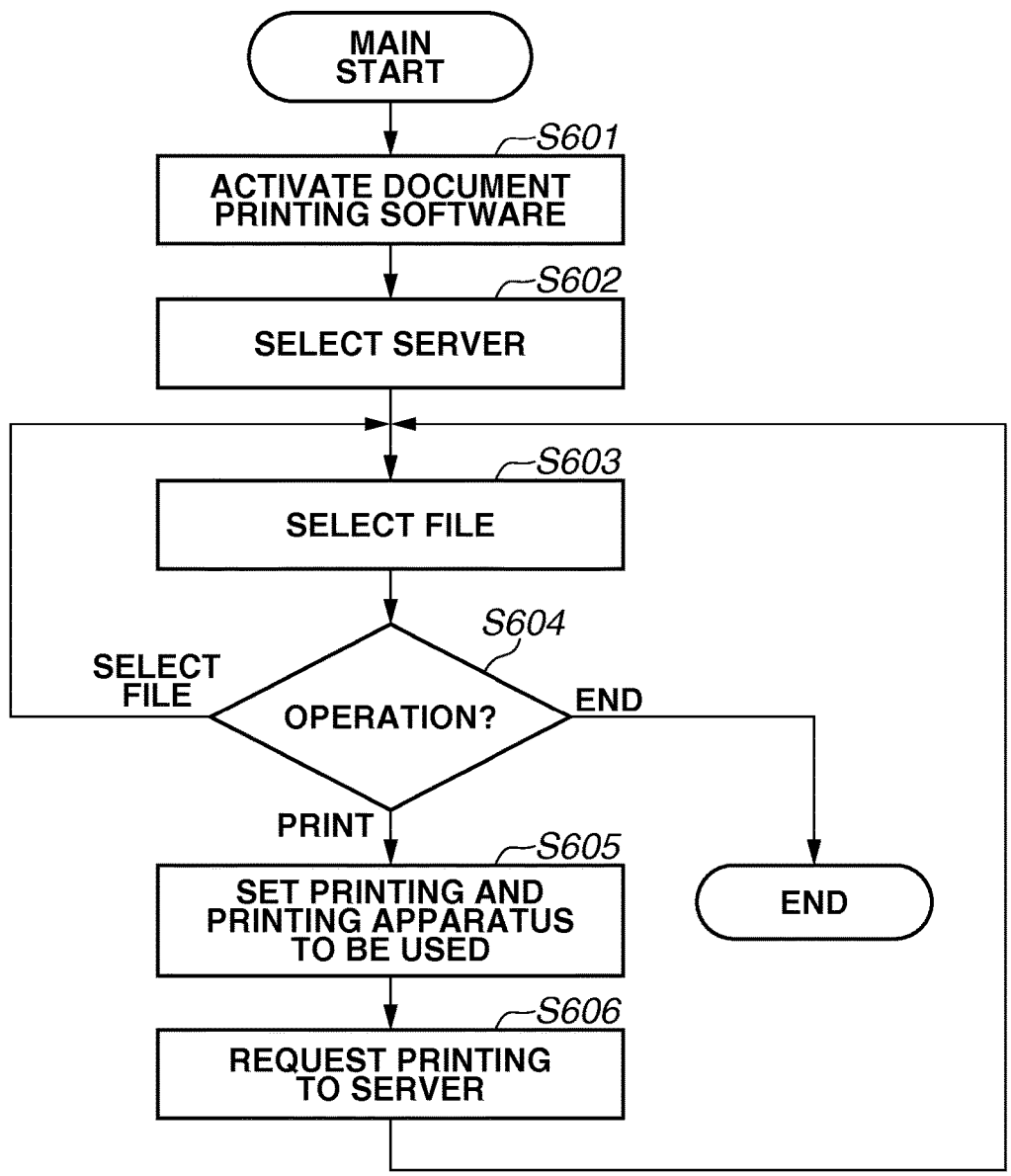
FIG. 5 is a flowchart illustrating processing for requesting printing of a document.

FIG. 5 is a flowchart illustrating processing for requesting printing of the document to the data conversion server 420 according to the present exemplary embodiment. The document printing software stored in the storage device 325 of the client PC 410 is loaded to the memory unit 323 to be executed by the CPU 321. First, in step S601, the user activates the document printing software. Next, in step S602, a server used to generate a PDL command is selected via the input unit 412. The server (not illustrated) may be a server correlated to the document printing software in advance, or determined based on a Uniform Resource Locator (URL) when PDL conversion is provided as a web service. In step S603, a document to be printed is selected from the server selected in step S602. In step S604, determination is made as to which of a file selection operation, an end operation, and a printing operation an operation via the input unit 412 is. When it is determined in step S604 that the operation is the printing operation, the processing proceeds to step S605 to set printing such as Nup or the number of copies and which printing apparatus is used to print the document. Then, in step S606, a printing request (printing command) of the selected document is issued to the data conversion server 420 and, returning to step S603, the processing is repeated. When it is determined in step S604 that the operation is the file selection operation, returning to step S603, the processing is repeated. When it is determined in step S604 that the operation is the end operation, the processing of the document printing software ends.

Figure 6:
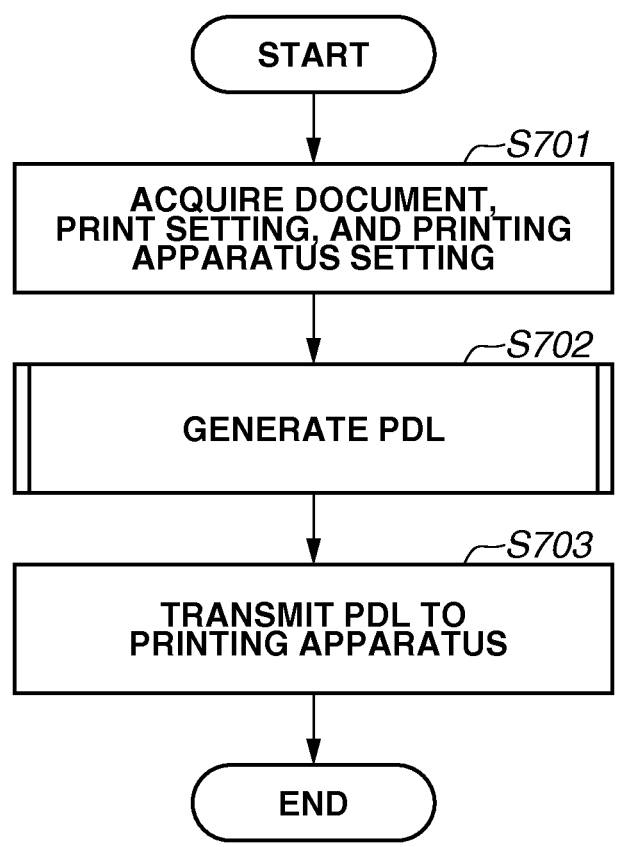
FIG. 6 is a flowchart illustrating PDL generation processing according to a printing request.

FIG. 6 is a flowchart illustrating processing carried out in the data conversion server 420 according to the printing request from the client PC 410. The processing is executed in synchronization with the processing of the client PC 410 described above referring to FIG. 3. The processing described below is carried out by the data conversion unit 423. After reception of the printing request transmitted in step S606 illustrated in FIG. 5, in step S701, the data conversion unit 423 acquires setting as to a target document, printing and a printing apparatus used to execute printing. Then, in step S702, the data conversion unit 423 generates a PDL command corresponding to an analyzed drawing to be described below referring to FIG. 7. In step S703, the data conversion unit 423 transmits the PDL command generated in step S702 to the printing apparatus 430 designated based on the setting acquired in step S701. Thus, the processing carried out in the data conversion server 420 ends.

Figure 7:
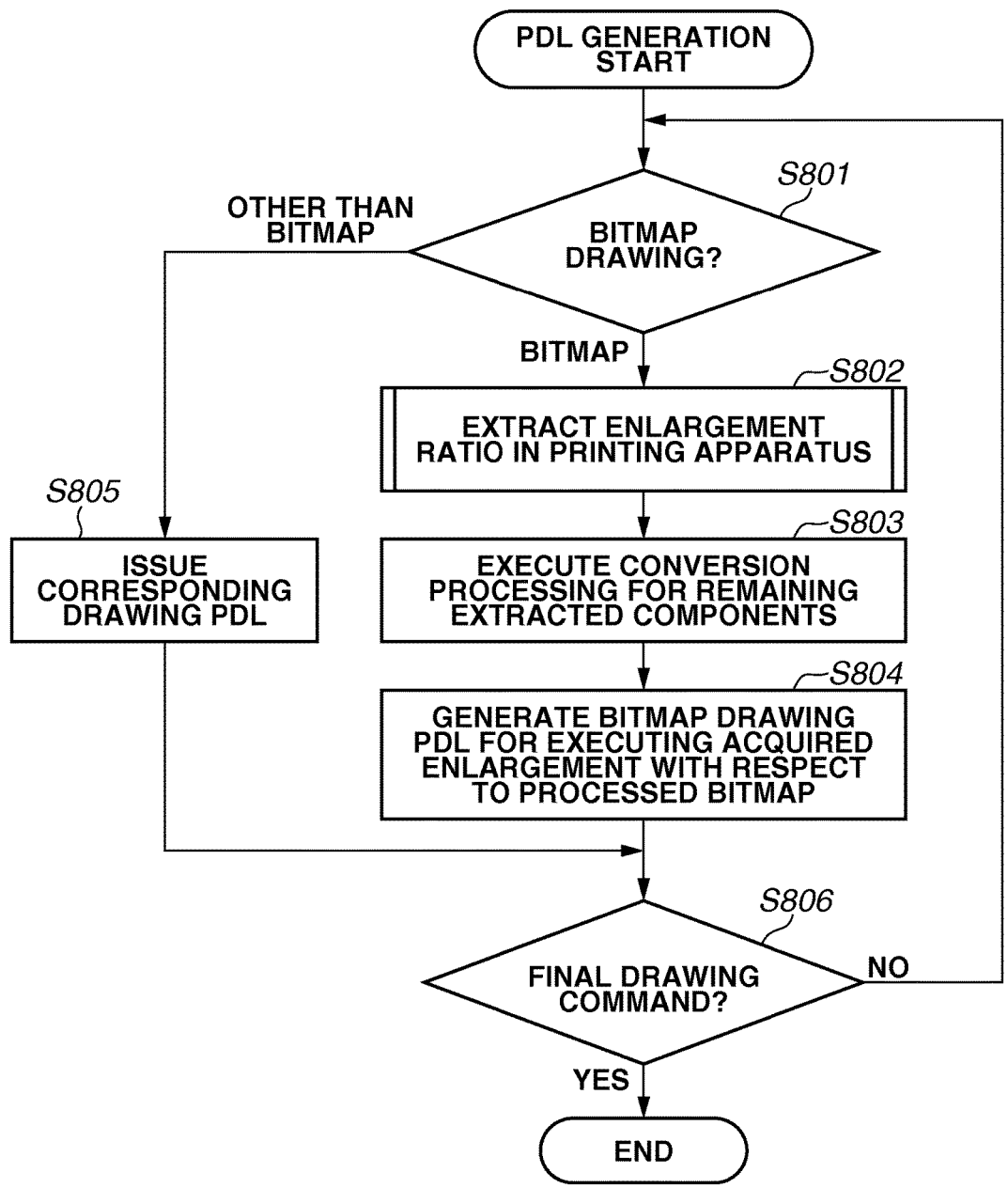
FIG. 7 is a flowchart illustrating specific PDL generation processing.

FIG. 7 is a flowchart illustrating PDL generation processing executed in step S702 in detail. First, in step S801, the data conversion unit 423 determines whether a first drawing content is a bitmap drawing similar to the drawing 501 illustrated in FIG. 4. In the present exemplary embodiment, the determination is made based on a content of the document. However, the document targeted for PDL generation may be internally converted into other intermediate data, and whether the drawing content is a bitmap drawing command of the intermediate data may be determined. When it is determined in step S801 that the drawing content is other than the bitmap drawing, the processing proceeds to step S805, and the data conversion unit 423 generates a PDL command for executing drawing similar to that in the document. Then, the processing proceeds to step S806. On the other hand, when it is determined in step S801 that the drawing content is the bitmap drawing, the processing proceeds to step S802, and the data conversion unit 423 extracts (specifies) an enlargement ratio (enlarged component) in the printing apparatus 430 to be described below referring to FIG. 8. The enlarged component includes an X-direction component (first-direction component) and a Y-direction component (second-direction component).

In step S803, the data conversion unit 423 executes, on a host side, conversion processing for remaining enlarged components other than those extracted in step S802. In step S804, the data conversion unit 423 generates a PDL command for executing, in the printing apparatus 430, the enlargement acquired in step S802 with respect to the bitmap subjected to the PDL conversion processing. In other words, the PDL command generated for bitmap enlargement is a command conforming (suited) to the printing apparatus 430. The conversion processing for the enlarged components other than those extracted in step S802 is, for example, enlargement processing, rotation processing, or skew processing based on the extracted enlarged components. In step S806, the data conversion unit 423 determines whether the processed PDL command is a final drawing command. When not a final drawing command (No in step S806), returning to step S801, the processing is repeated. When a final drawing command (YES in step S806), the processing ends. Then, the processing proceeds to step S703 illustrated in FIG. 6.

Figure 8:
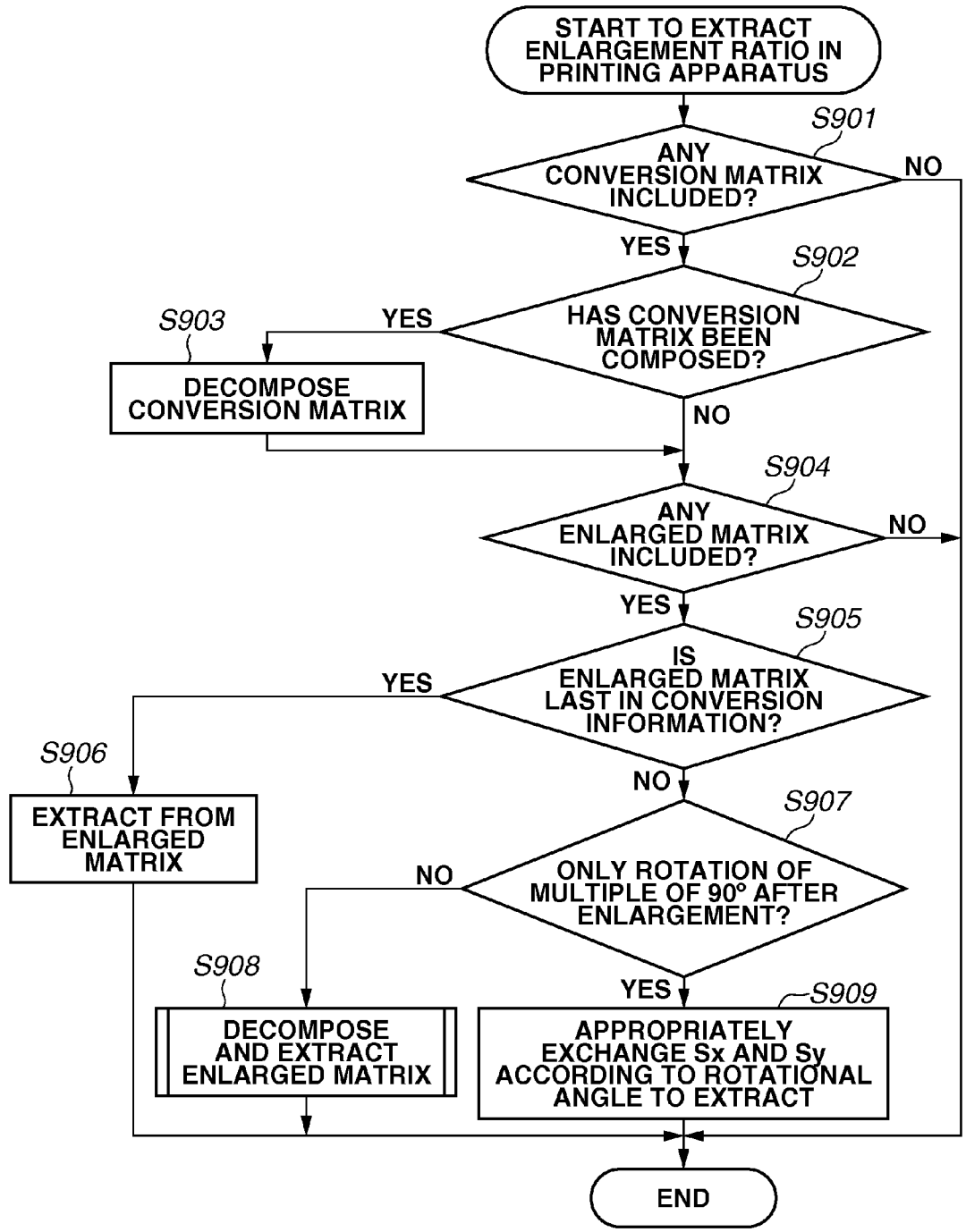
FIG. 8 is a flowchart illustrating extraction processing of an enlarged component performed on a printing apparatus side.

FIG. 8 is a flowchart illustrating extraction processing of the enlarged component performed in step S802 illustrated in FIG. 7 in the printing apparatus 430. Hereinafter, information on conversion with respect to the bitmap is all represented and described as a conversion matrix. However, generality is not lost. A plurality (one or more) of conversion matrixes is collectively referred to as a conversion matrix group. First, in step S901, the data conversion unit 423 determines whether the bitmap drawing includes any conversion matrix such as a rotation matrix or an enlarged matrix similar to the matrix 502 illustrated in FIG. 4. When it is determined that no conversion matrix is included (NO in step S901), the processing ends without extracting any enlargement ratio in the printing apparatus 430. On the other hand, when it is determined that a conversion matrix is included (YES in step S901), in step S902, the data conversion unit 423 determines whether any conversion matrix has been composed. As for a determination method for such composition, when the conversion matrix does not match any format of the matrixes 202, 204, and 206 of the conversion matrixes illustrated in FIG. 1, it can be determined that a conversion matrix has been composed.

When it is determined that a conversion matrix has been composed (YES in step S902), the processing proceeds to step S903. In step S903, the data conversion unit 423 decomposes the conversion matrix into a combination of simple linear conversion such as a rotation matrix or an enlarged matrix. An arbitrary conversion matrix can be decomposed, by using QR decomposition, into a rotation matrix (matrix 201), a scaling matrix (matrix 202), and a skew matrix (matrix 203). Therefore, as an example of a decomposing method, the QR decomposition can be cited. On the other hand, when it is determined that no conversion matrix has been composed (NO in step S902), the processing proceeds to step S904.

In step S904, the data conversion unit 423 determines whether the conversion matrix group includes any enlarged matrix. When not included (NO in step S904), the processing ends without extracting any enlargement ratio in the printing apparatus 430. Then, the processing proceeds to step S703 illustrated in FIG. 6. On the other hand, when an enlarged matrix is included (YES in step S904), the processing proceeds to step S905. Whether any enlarged matrix (enlargement processing) is included can be determined based on whether the conversion matrix group includes any matrix matching the format of the enlarged matrix indicated by the matrix 202 illustrated in FIG. 1. In step S905, the data conversion unit 423 determines whether the enlarged matrix in the conversion matrix group is a last conversion matrix as conversion with respect to the bitmap. In other words, when the conversion matrix group (conversion processing) includes enlargement processing and processing other than the enlargement processing, the data conversion unit 423 determines whether the last conversion matrix is an enlarged matrix. When the enlarged matrix is a last conversion matrix (YES in step S905), the processing proceeds to step S906. In step S906, the data conversion unit 423 extracts the described enlarged matrix as an enlargement ratio in the printing apparatus 430. When Sx and Sy in the matrix 202 illustrated in FIG. 1 are both equal to 1 or less, no extraction is carried out. When one of the Sx and the Sy is less than 1, for example, with Sx=0.5 and Sy=2.0, only the Sy is extracted, and an enlarged matrix in the printing apparatus 430 is [0 0 0 2.0], while an enlarged matrix on the host side is remaining [0.5 0 0 0]. In the present exemplary embodiment, the aforementioned processing is referred to as processing A.

On the other hand, when it is determined that the enlarged matrix is not a last conversion matrix (NO in step S905), the processing proceeds to step S907. In step S907, the data conversion unit 423 determines whether a conversion matrix present after the enlarged matrix is only a rotation matrix (rotation processing) of a multiple of 90°. Specifically, the data conversion unit 423 determines which of matrixes [1 0

Figure 9:
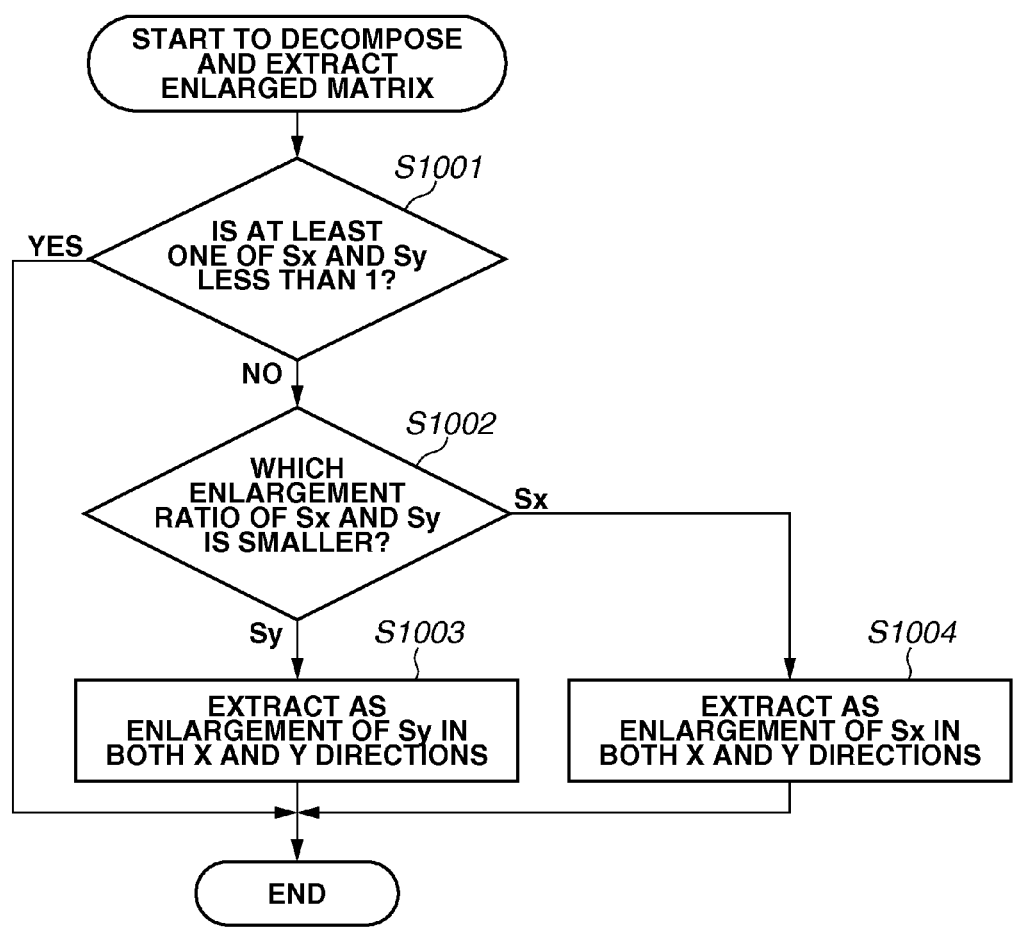
FIG. 9 is a flowchart illustrating processing for decomposing and extracting the enlarged component.
Figure 12A:
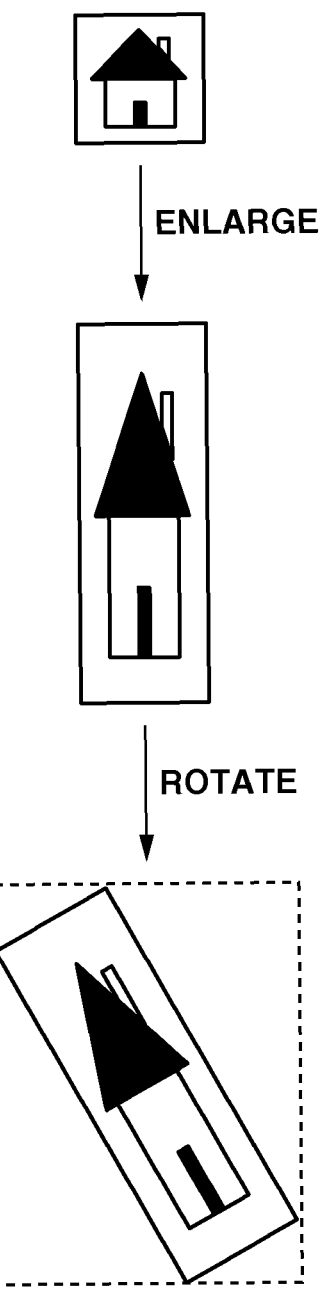
FIGS. 12A and 12B are diagrams illustrating examples of bitmaps when conversion processing is performed.
Figure 12B:
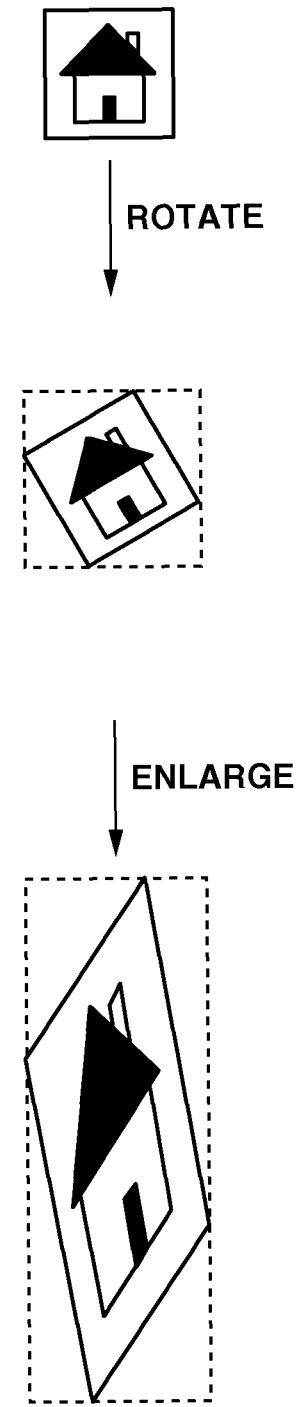

0 1] (rotation by 0°), [0 1 −1 0] (rotation by 90°), [−1 0 0 −1] (rotation by) 180°, and [0 −1 1 0] (rotation by 270°) is only present after the enlarged matrix. When it is determined that the conversion matrix present after the enlarged matrix is only a rotation matrix of a multiple of 90° (YES in step S907), the processing proceeds to step S909. In step S909, the data conversion unit 423 exchanges the Sx and the Sy according to a rotational angle to extract an enlargement ratio. Specifically, in the case of 90° and 270°, an enlarged matrix ([Sy 0 0 Sx]) in which the Sx and the Sy have been exchanged is set as an enlarged matrix in the printing apparatus 430 to extract an enlargement ratio. In the case of 0° and 180°, without exchanging the Sx and the Sy, an enlarged matrix ([Sx 0 0 Sy]) is set as an enlarged matrix in the printing apparatus 430 to extract an enlargement ratio. Here, the processing A is also applied. On the other hand, when it is determined that the conversion matrix present after the enlarged matrix is not only a rotation matrix of a multiple of 90° (others are present in addition to matrix of multiple of 90°) (NO in step S907), the processing proceeds to step S908. In step S908, decomposition and extraction of the enlarged matrix to be described below referring to FIG. 9 are carried out. Thus, the processing ends, and the processing proceeds to step S803 illustrated in FIG. 7.

FIG. 9 is a flowchart illustrating, in detail, processing for decomposing and extracting the enlarged matrix executed in step S908 illustrated in FIG. 8 in the printing apparatus 430. First, in step S1001, the data conversion unit 423 determines whether at least one of the Sx and the Sy in the enlarged matrix is less than 1. When at least one is less than 1 (YES in step S1001), the processing ends without extracting any enlargement ratio in the printing apparatus 430. On the other hand, when both the Sx and the Sy are equal to or more than 1 (NO in step S1001), the processing proceeds to step S1002. In step S1002, the data conversion unit 423 determines which of the Sx and the Sy is smaller. In other words, the data conversion unit 423 compares values of the first-direction and second-direction enlarged components (Sx and Sy) with each other to determine which of the values is relatively smaller. When the Sx is smaller, the processing proceeds to step S1004. In step S1004, an enlargement ratio is extracted as an enlarged matrix of the Sx in both the X and Y directions. On the other hand, when the Sy is smaller, the processing proceeds to step S1003. In step S1003, an enlargement ratio is extracted as an enlarged matrix of the Sy in both the X and Y directions. Specific examples of steps S1003 and S1004 will be described below referring to FIG. 10. Thus, components of enlargement processing are equal to 1 or more on both the client PC 410 side and the printing apparatus 430 side, and any deterioration caused by thinning or the like can be prevented.

FIG. 10 is a diagram illustrating specific extraction examples of steps S1003 and S1004 illustrated in FIG. 9. A matrix group 1101 is a conversion matrix group, and conversion is carried out from the right in order because of matrix calculation. In the matrix group 1101, a numerical value of the Sy is smaller in Sx (=6.0) and Sy (=2.0). Thus, the Sy (=2.0) is set as an enlargement ratio in the X and Y directions. A matrix group decomposed so as to be extracted as an enlarged matrix is a matrix group 1102. Here, when components in the X and Y directions are the same in the enlarged matrix, it is known that exchanging is possible with a rotation matrix or a skew matrix. A matrix group 1103 is a matrix group in which an extracted enlarged component has been exchanged with a rotation matrix or a skew matrix. The matrix group 1103 is a processing part of a matrix 1104 in the printing apparatus 430, and a matrix group 1105 is a processing part in the client PC 410.

FIGS. 11A and 11B are diagrams illustrating a difference of PDL commands between when the processing of the present exemplary embodiment is not applied (conventional case) and when applied. FIG. 11A illustrates an example of a PDL command in the conventional case where the aforementioned processing is not applied for an input document. A command 1201 is a command indicating that conversion with respect to a bitmap has all been carried out on the client PC 410 side. This clearly shows that a size of the PDL command is larger. On the other hand, FIG. 11B illustrates an example of a PDL command when the processing of the present exemplary embodiment is applied. A command 1203 is a command concerning the enlarged component extracted in step S802 illustrated in FIG. 7, and a command 1202 is a command for drawing a bitmap in which remaining conversion processing (rotation processing or skew processing) has been executed. In this case, a size is smaller than the command 1201 by an amount equal to a part not subjected to enlargement, and a size of the PDL command can therefore be reduced. The PDL command thus generated is transmitted to the printing apparatus 430. In the printing apparatus 430, the data reception unit 436 acquires the PDL command generated in step S702 illustrated in FIG. 6. Then, the printing unit 434 interprets the acquired PDL command, converts all drawings included in the PDL into a bitmap, and executes printing processing on a medium such as paper.

Thus, according to the present exemplary embodiment, since by executing appropriate data conversion processing during the document printing, the size of the PDL command is reduced, and communication time can be reduced. As a result, total printing time can be reduced. Further, according to the present exemplary embodiment, the conversion processing with respect to the bitmap is analyzed by the data conversion server 420, the enlarged component is appropriately extracted in the printing apparatus 430, and the PDL command for enlargement in the printing apparatus 430 is generated. Thus, a PDL command reduced in size can be generated.

According to the present exemplary embodiment, the PDL command is directly transmitted from the data conversion server 420 to the printing apparatus 430 to execute printing. However, for example, the PDL command generated by the data conversion server 420 may be first transmitted to the client PC 410, and the client PC 410 may then transmit the PDL command to the printing apparatus 430. According to the present exemplary embodiment, the PDL command is generated by the data conversion server 420. However, the client PC 410 may execute the processing of step S702 or S703 illustrated in FIG. 6. Further, the bitmap drawing conversion processing according to the present exemplary embodiment may be carried out not by an application in the client PC or the server but by a printer driver.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The exemplary embodiments of the present invention have been described. However, the present invention is not limited to the exemplary embodiments. Various changes and modifications can be made within the gist of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-108421, filed May 26, 2014, which is hereby incorporated by reference herein in its entirety.

What is claimed is:

1. An information processing apparatus comprising:
a memory; and
at least one processor in communication with the memory, wherein the at least one processor performs:
acquiring data targeted for PDL (page description language) generation, the acquired data including first image data determined to be bitmap data for which a geometric transformation processing is instructed, wherein the geometric transformation processing includes at least one of first enlargement processing, rotation processing and skew processing;
determining whether the instructed geometric transformation processing includes the first enlargement processing;
extracting, based on a processing order of the first enlargement processing and a rotational angle of the rotation processing to be performed after the first enlargement processing, second enlargement processing to be performed by a printing apparatus from the instructed geometric transformation processing if it is determined that the instructed geometric transformation processing includes the first enlargement processing;
obtaining second image data by performing a second geometric transformation processing for the first image data, wherein the second geometric transformation processing is a geometric transformation processing other than the extracted second enlargement processing in the first geometric transformation processing;
generating a command for performing the extracted second enlargement processing for the obtained second image data, wherein the generated command instructs the printing apparatus to execute the second enlargement processing; and
transmitting the generated command to the printing apparatus.

2. The information processing apparatus according to claim 1, wherein the first enlargement processing includes a first enlargement value of a first-direction and a second enlargement value of a second-direction orthogonal to the first-direction.

3. The information processing apparatus according to claim 2, wherein, if the rotation processing, which is to be performed after the first enlargement processing, rotates image data by a rotational angle different from a multiple of 90 degrees, the extracting extracts the second enlargement processing based on smaller one of the first and second enlargement values of the first-direction and second-direction.

4. The information processing apparatus according to claim 3, wherein the extracting does not extract the second enlargement processing if at least one of the first and second values of the first-direction and second-direction is less than 1.

5. The information processing apparatus according to claim 2, wherein, if the rotation processing, which is to be performed after the first enlargement processing, rotates image data by any one of 90 or 270 degrees, the extracting extracts the second enlargement processing by exchanging the first and second enlargement values of the first-direction and second-direction.

6. The information processing apparatus according to claim 1, wherein, if the processing order of the first enlargement processing is last in the instructed geometric transformation processing, the extracted second enlargement processing is same as the first enlargement processing.

7. The information processing apparatus according to claim 1, wherein the instructed transformation processing is instructed as a transformation matrix, and wherein the determining determines, after decomposing the transformation matrix using QR decomposition, whether the instructed geometric transformation processing includes the first enlargement processing.

8. The information processing apparatus according to claim 7, wherein the determining determines, by analyzing a diagonal matrix acquired via the QR decomposition, whether the instructed geometric transformation processing includes the first enlargement processing.

9. The information processing apparatus according to claim 1, wherein the first image data is bitmap data.

10. An information processing method comprising:
acquiring data targeted for PDL (page description language) generation, the acquired data including first image data determined to be bitmap data for which a geometric transformation processing is instructed, wherein the geometric transformation processing includes at least one of first enlargement processing, rotation processing and skew processing;
determining whether the instructed geometric transformation processing includes the first enlargement processing;
extracting, based on a processing order of the first enlargement processing and a rotational angle of the rotation processing to be performed after the first enlargement processing, second enlargement processing to be performed by a printing apparatus from the instructed geometric transformation processing if it is determined that the instructed geometric transformation processing includes the first enlargement processing;
obtaining second image data by performing a second geometric transformation processing from the first image data, wherein the second geometric transformation processing is a geometric transformation processing other than the extracted second enlargement processing in the first geometric transformation processing;

generating a command for performing the extracted second enlargement processing for the obtained second image data, wherein the generated command instructs the printing apparatus to execute the second enlargement processing; and transmitting the generated command to the printing apparatus.

11. The information processing apparatus according to claim 10, wherein the first image data is bitmap data.

12. A non-transitory computer-readable storage medium storing instructions that, when executed by one or more processors, causes the one or more processors to execute a method, the method comprising:

acquiring data targeted for PDL (page description language) generation, the acquired data including first image data determined to be bitmap data for which a geometric transformation processing is instructed, wherein the geometric transformation processing includes at least one of first enlargement processing, rotation processing and skew processing;

determining whether the instructed geometric transformation processing includes the first enlargement processing;

extracting, based on a processing order of the first enlargement processing and a rotational angle of the rotation processing to be performed after the first enlargement processing, second enlargement processing to be performed by a printing apparatus from the instructed geometric transformation processing if it is determined that the instructed geometric transformation processing includes the first enlargement processing;

obtaining second image data by performing a second geometric transformation processing from the first image data, wherein the second geometric transformation processing is a geometric transformation processing other than the extracted second enlargement processing in the first geometric transformation processing;

generating a command for performing the extracted second enlargement processing for the obtained second image data, wherein the generated command instructs the printing apparatus to execute the second enlargement processing; and transmitting the generated command to the printing apparatus.

13. The non-transitory computer-readable medium according to claim 12, wherein the first image data is bitmap data.

* * * * *